United States Patent Office 2,992,656
Patented July 18, 1961

2,992,656
LIQUID RESERVOIRS FOR AIRCRAFT
George Beattie Elliott, Preston, and James Wray, Shoreham-by-Sea, England, assignors to The English Electric Company Limited, London, England, a British company
Filed Feb. 2, 1959, Ser. No. 790,727
Claims priority, application Great Britain Feb. 5, 1958
4 Claims. (Cl. 137—576)

The present invention relates to liquid reservoirs for aircraft, for example to tanks for the hydraulic fluid for the hydraulic service system of an aircraft.

It is important that the performance of such a tank shall not be affected by its position in space or by any accelerations which it may assume in the course of or be subject to by aerobatics of the aircraft, that the liquid inside it, although pressurised by an air or gas system, shall not substantially take up any of the air or gas so as to become emulsified, and that although a return inlet and a suction outlet is provided in the tank, the vortices formed by returning liquid shall not reach the suction outlet, nor shall the returning liquid itself reach that outlet without substantially circulating around the tank and thereby becoming cooled or reduced to the same temperature as the bulk of the liquid. It is also desirable that a sight glass may be provided to show the liquid level in the container.

According to the present invention in a liquid reservoir for aircraft as referred to hereinabove, a shell resistant to internal pressure contains a perforated baffle passing substantially through the centre of said shell from wall to wall, inlet and outlet pipes for the liquid issuing at or near said centre at opposite sides of said baffle. This shell is filled with the liquid to a working level of the order of ¾ to ⅞ of its volume, and gas or air pressurisation is applied in the remaining space to such a degree that boiling at low ambient pressure (high altitude) and high temperature is prevented. Preferably the said shell has the shape of an oblate spheroid, and the said baffle is cruciform and its portions extend on intersecting diameters of the said shell. Inlet and outlet pipes are brought from the outside skin of the tank to its centre and preferably terminate in cone pieces, so that their orifices are on opposite sides of the baffle, i.e. the pipe which is on one side of the baffle has its orifices on the opposite side of the baffle. The purpose of this is to prevent any vortices formed at the inlet pipe orifice from reaching the outlet pipe orifice without travelling away and round the bulk of the liquid, thereby losing their motion, and to avoid sharp corners in the pipe ducts.

Figure 1:
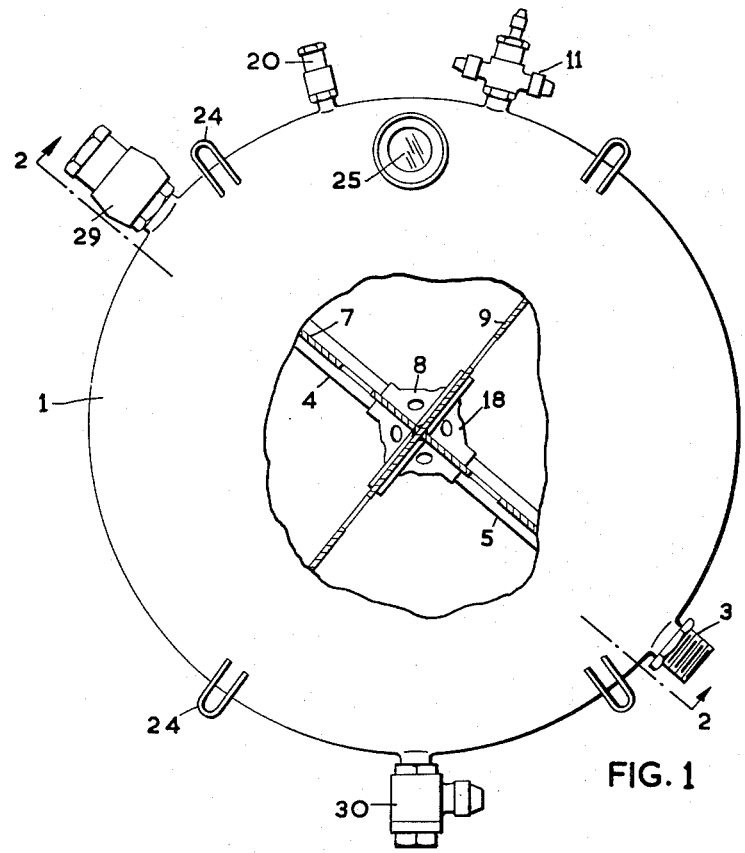
Figure 2:
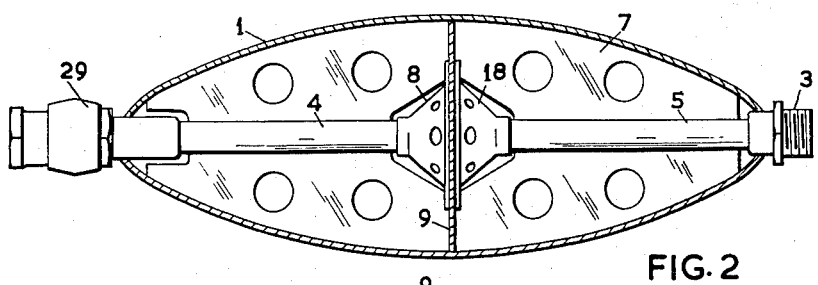
Figure 3:
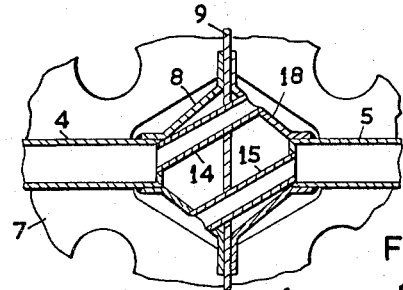
Figure 4:
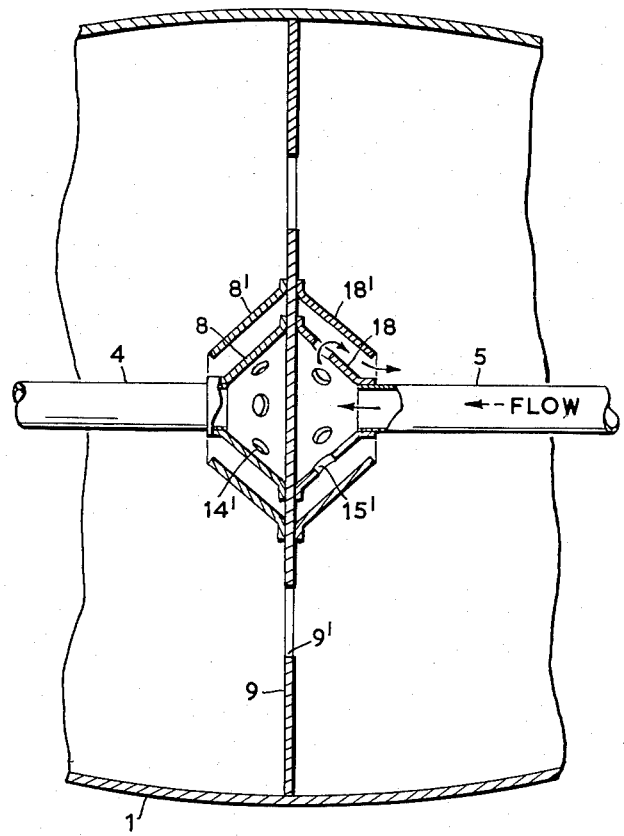

In order that the invention may be clearly understood and readily carried into effect, an embodiment thereof will now be described by way of example with reference to the accompanying drawings in which:

FIG. 1 is a diagrammatic elevation partly in section,
FIG. 2 is a section on the line 2—2 of FIG. 1,
FIG. 3 is a detail of FIG. 2 in section on a larger scale, and,
FIG. 4 is a diagrammatic sectional elevation of a modified embodiment, on a larger scale.

The tank consists of an oblate spherical shell 1 welded up from two symmetrical halves, and is divided by two holed baffle plates 7 and 9 crossing one another at right angles substantially in the centre of the shell 1. A suction pipe 5 and a return pipe 4 are embedded in the baffle 7 along the centre line thereof connecting adapters 3 and 29, respectively, outside the shell 1 to centre cones 8, 18 fixed with their broad bases to opposite sides of the baffle 9. Ducts 14, 15 (FIG. 3) are passed through the said centre cones in such a manner that a duct or ducts 15 from the suction pipe 5 issue on the side of the shell 1 surrounding the return pipe 4, and conversely a duct or ducts 14 from the return pipe 4 issue on the side of the shell surrounding the suction pipe 5, i.e. on the opposite side of the baffle 9, respectively.

A sight glass 25 is provided in the upper part of the shell 1, where also an adapter 20 for air pressurisation and a multiple adapter 11 for overflow and pressure relief are arranged. On the bottom of the shell 1 an adapter 30 for drainage and auxiliary suction is provided. The shell 1 is suspended on four mounting brackets 24.

By the arrangement of the ducts 14 and 15 at obtuse angles to the pipes 4 and 5 any sharp corners and resulting fluid resistance are obviated.

It is found in practice with a tank constructed in this manner that vortices from the inlet do not reach the suction orifices, that the inlet fluid arriving hot travels a large part of the tank and cools off before being sucked out again by the suction pipe, that the pressurising air in the tank does not get to the centre of the tank and does not emulsify with the liquid because of the lack of disturbance owing to the vortices, that the tank operates satisfactorily under aerobatic conditions without an emulsified liquid getting into the outlet pipe, and that because of its greater strength the tank can be more highly pressurised than can a collapsible type of bag tank. This performance appears to be achieved by the combination of the features mentioned above, particularly the baffles, the central inlet-and-outlet-orifices each pointing away from the other and the fluid level in the tank chosen at about ¾ to ⅞ of its volume to ensure that fluid always covers the orifices at the tank centre.

While the shape of an oblate spheroid is preferred, the tank 1 may be given any other suitable shape, for example a spherical shape or an egg shape.

Referring now to FIG. 4, the inlet pipe 5 and return pipe 4 are again connected to the small bases of truncated cones 18 and 8, respectively, the broad bases of which are attached opposite one another on different sides of the baffle 9, which has holes 9'. The mantles of the cones 18 and 8 have perforations 15' and 14', respectively, and are surrounded with clearance by larger truncated cones 18', 8', respectively, which leave annular gaps between their free small bases and the pipes 5, 4, respectively, and with their large bases are attached opposite one another at different sides of the baffle 9, co-axially to the pipes 5, 4.

The flow from the pipe 5 through cone 18, perforations 15' and out of the annular gap between the outer truncated cone 18' and the pipe 5 is indicated by arrows. The holes 9' establish communication between the two sides of the baffle 9, while preventing any violent flow, and the inflow into the return pipe 4 is similar to but the inverse of that shown on the right hand side of the baffle 9. This arrangement is as effective as that according to FIGS. 1 to 3, and is easier to produce.

What we claim as our invention and desire to secure by Letters Patent, is:

1. A liquid reservoir for aircraft wherein the liquid is pressurised in operation and does not mix with the pressurising gas but circulates after its entry before leaving the reservoir, so as to be cooled, comprising in combination: a shell having walls resistant to internal pressure, a perforated baffle passing substantially through the center of said shell from wall to wall, an inlet and an outlet pipe for the liquid extending from outside through the said shell into the interior thereof and issuing near the center thereof on opposite sides of said baffle, inner and outer truncated cone pieces attached co-axially with their large bases opposite one another at different sides of the said baffle near the center thereof, the said inlet pipe and said outlet pipe being each connected to the small base of one of the said inner cone pieces, the circumferences of said inner cone pieces being perforated, and the said outer truncated cone pieces surrounding their associated inner cone pieces with clearance, leaving annular gaps between the then free small bases and the associated tubes.

2. A reservoir as claimed in claim 1, comprising another baffle intersecting said baffle near the centre of the said shell, the said inlet pipe and the said outlet pipe being embedded in said other baffle.

3. A liquid reservoir for aircraft wherein the liquid is pressurised in operation and does not mix with the pressurising gas but circulates after its entry before leaving the reservoir, so as to be cooled, comprising in combination: a shell having walls resistant to internal pressure, a cruciform perforated baffle having portions extending on intersecting diameters of said shell passing substantially through the center of said shell from wall to wall, an inlet and an outlet pipe for the liquid extending from outside through the said shell into the interior thereof and issuing near the center thereof on opposite sides of said baffle, inner and outer truncated cone pieces attached co-axially with their large bases opposite one another at different sides of the said baffle near the center thereof, the said inlet pipe and said outlet pipe being each connected to the small base of one of the said inner cone pieces, the circumferences of said inner cone pieces being perforated, and the said outer truncated cone pieces surrounding their associated inner cone pieces with clearance, leaving annular gaps between the then free small bases and the associated tubes.

4. A liquid reservoir for aircraft wherein the liquid is pressurised in operation and does not mix with the pressurising gas, but circulates after its entry before leaving the reservoir, so as to be cooled, comprising in combination: a shell having walls resistant to internal pressure, a perforated baffle passing substantially through the centre of said shell from wall to wall, and an inlet and an outlet pipe for the liquid extending from outside through the said shell into the interior thereof and issuing near the centre thereof and on opposite sides of said baffle, said inlet and outlet pipes having truncated cone pieces attached with their large bases opposite one another at different sides of said baffle near the centre thereof, the said inlet and said outlet pipe being each connected to the small base of one of the said cone pieces and extended through its associated cone piece, said baffle and the circumference of the other cone piece.

References Cited in the file of this patent

UNITED STATES PATENTS

| | | |
|---|---|---|
| 479,594 | Hildebrandt | July 26, 1892 |
| 1,087,242 | Kelly | Feb. 17, 1914 |
| 1,402,528 | Nesbit | Jan. 3, 1922 |
| 1,924,038 | Herbsman | Aug. 22, 1933 |
| 2,335,694 | Paquin | Nov. 30, 1943 |
| 2,655,893 | Cox | Oct. 20, 1953 |